(12) United States Patent
Yamada et al.

(10) Patent No.: US 12,104,025 B2
(45) Date of Patent: *Oct. 1, 2024

(54) BIAXIALLY ORIENTED POLYPROPYLENE FILM

(71) Applicant: TOYOBO CO., LTD., Osaka (JP)

(72) Inventors: Kouji Yamada, Otsu (JP); Kazuhito Horinouchi, Otsu (JP); Mahiro Nakano, Inuyama (JP); Toru Imai, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 647 days.

This patent is subject to a terminal disclaimer.

(21) Appl. No.: 17/417,869

(22) PCT Filed: Dec. 19, 2019

(86) PCT No.: PCT/JP2019/049809
§ 371 (c)(1),
(2) Date: Jun. 24, 2021

(87) PCT Pub. No.: WO2020/137792
PCT Pub. Date: Jul. 2, 2020

(65) Prior Publication Data
US 2022/0064388 A1    Mar. 3, 2022

(30) Foreign Application Priority Data

Dec. 28, 2018  (JP) .................................. 2018-247985
Oct. 28, 2019  (JP) .................................. 2019-195472

(51) Int. Cl.
*C08J 5/18* (2006.01)
*B29C 55/12* (2006.01)
*B29K 23/00* (2006.01)

(52) U.S. Cl.
CPC ................. *C08J 5/18* (2013.01); *B29C 55/12* (2013.01); *B29K 2023/12* (2013.01); *B29K 2995/0053* (2013.01); *C08J 2323/12* (2013.01)

(58) Field of Classification Search
None
See application file for complete search history.

(56) References Cited

U.S. PATENT DOCUMENTS

| | | | |
|---|---|---|---|
| 6,541,123 | B1 | 4/2003 | Taniguchi et al. |
| 9,637,602 | B2 | 5/2017 | Potter et al. |
| 2010/0225032 | A1 | 9/2010 | Nakane et al. |
| 2015/0267014 | A1 | 9/2015 | Neissl et al. |
| 2016/0304681 | A1 | 10/2016 | Potter et al. |

FOREIGN PATENT DOCUMENTS

| | | | | |
|---|---|---|---|---|
| CN | 103128956 | A | 6/2013 | |
| CN | 106103553 | A | 11/2016 | |
| CN | 107406543 | A | 11/2017 | |
| CN | 108749019 | A | 11/2018 | |
| CN | 108884246 | A | 11/2018 | |
| EP | 0026911 | A1 | 4/1981 | |
| EP | 1090947 | B1 | 7/2008 | |
| EP | 3069850 | A1 | 9/2016 | |
| EP | 3124523 | A1 | 2/2017 | |
| EP | 3296348 | A1 | 3/2018 | |
| EP | 3083777 | B1 | 4/2019 | |
| EP | 3124205 | B1 | 4/2021 | |
| JP | H11-106520 | A | 4/1999 | |
| JP | 2013-177645 | A | 9/2013 | |
| JP | 2014051657 | A * | 3/2014 | ........... B29C 55/143 |
| JP | 2014-231584 | A | 12/2014 | |
| JP | 2017-226161 | A | 12/2017 | |
| JP | 2018-130958 | A | 8/2018 | |
| JP | 2018-141122 | A | 9/2018 | |
| KR | 2015-0035736 | A | 4/2015 | |
| KR | 2016-0086327 | A | 7/2016 | |
| KR | 2018-0128027 | A | 11/2018 | |
| TW | 201210795 | A | 3/2012 | |
| WO | WO-2015012324 | A1 * | 1/2015 | ................ C08J 5/18 |
| WO | WO 2015/091839 | A1 | 6/2015 | |
| WO | WO 2015/146893 | A1 | 10/2015 | |
| WO | WO 2016/002281 | A1 | 1/2016 | |
| WO | WO 2016/182003 | A1 | 11/2016 | |
| WO | WO-2017017244 | A1 * | 2/2017 | ............. A47B 13/06 |

(Continued)

OTHER PUBLICATIONS

WO-2017017244-A1, 2017, machine translation (Year: 2017).*
JP-2014051657-A, 2014, machine translation (Year: 2014).*
WO-2015012324-A1, 2015, machine translation (Year: 2015).*
China National Intellectual Property Administration, Decision of Rejection in Chinese Patent Application No. 201980086038.6 (May 19, 2023).
China National Intellectual Property Administration, Third Office Action in Chinese Patent Application No. 20198008958.6 (May 25, 2023).

(Continued)

*Primary Examiner* — Satya B Sastri
(74) *Attorney, Agent, or Firm* — Leydig, Voit & Mayer, Ltd.

(57) ABSTRACT

Provided is a biaxially oriented polypropylene film that has high stiffness, has excellent heat resistance at a high temperature of 150° C., easily maintains a bag shape when being made into a packaging bag, and has less pitch shift during printing or fewer wrinkles in a sealed portion when being heat-sealed. A biaxially oriented polypropylene film, wherein a maximum elongation of the biaxially oriented polypropylene film at 150° ° C. or lower measured by a thermomechanical analyzer (TMA) is not larger than 1.5 mm in a longitudinal direction and not larger than 0.1 mm in a width direction, and a heat shrinkage rate of the biaxially oriented polypropylene film at 150° C. is not higher than 10% in the longitudinal direction and not higher than 30% in the width direction.

16 Claims, No Drawings

(56) References Cited

FOREIGN PATENT DOCUMENTS

| WO | WO 2017/170244 A1 | 10/2017 |
| WO | WO 2017/221781 A1 | 12/2017 |
| WO | WO 2018/180164 A1 | 10/2018 |
| WO | WO 2020/137789 A1 | 7/2020 |
| WO | WO 2020/137790 A1 | 7/2020 |
| WO | WO 2020/137791 A1 | 7/2020 |
| WO | WO 2020/137793 A1 | 7/2020 |

OTHER PUBLICATIONS

Intellectual Property India, Hearing Notice in Indian Patent Application No. 202147031909 (Jul. 4, 2023).
China National Intellectual Property Administration, Office Action in Chinese Patent Application No. 201980086055.X (Sep. 9, 2022).
Intellectual Property India, Examination Report in Indian Patent Application No. 202147031787 (Nov. 15, 2022).
Intellectual Property India, Examination Report in Indian Patent Application No. 202147031796 (Oct. 21, 2022).
Intellectual Property India, Examination Report in Indian Patent Application No. 202147031909 (Nov. 15, 2022).
Taiwan Intellectual Property Office, Office Action in Taiwanese Patent Application No. 108147566 (Jul. 20, 2023).
Taiwan Intellectual Property Office, Office Action in Taiwanese Patent Application No. 108147639 (May 9, 2023).
Taiwan Intellectual Property Office, Office Action in Taiwanese Patent Application No. 108147653 (Jun. 8, 2023).
Korean Intellectual Property Office, Notification of Reason for Refusal in Korean Patent Application No. 10-2021-7023344 (Mar. 4, 2022).
Korean Intellectual Property Office, Notification of Reason for Refusal in Korean Patent Application No. 10-2021-7023397 (Mar. 4, 2022).
Korean Intellectual Property Office, Notification of Reason for Refusal in Korean Patent Application No. 10-2021-7023399 (Mar. 7, 2022).
China National Intellectual Property Administration, Notification of the Second Office Action in Chinese Patent Application No. 201980085958.6 (Feb. 5, 2023).
China National Intellectual Property Administration, Notification of the Second Office Action in Chinese Patent Application No. 201980086038.6 (Feb. 9, 2023).
China National Intellectual Property Administration, Notification of the Second Office Action in Chinese Patent Application No. 201980086055.X (Apr. 3, 2023).
Intellectual Property India, Examination Report in Indian Patent Application No. 202147031791 (Jan. 2, 2023).
Intellectual Property India, Examination Report in Indian Patent Application No. 202147031803 (Jan. 4, 2023).
China National Intellectual Property Administration, Office Action in Chinese Patent Application No. 201980085955.2 (Aug. 3, 2022).
China National Intellectual Property Administration, Office Action in Chinese Patent Application No. 201980085958.6 (Aug. 2, 2022).
China National Intellectual Property Administration, Office Action in Chinese Patent Application No. 201980085964.1 (Aug. 17, 2022).
China National Intellectual Property Administration, Office Action in Chinese Patent Application No. 201980086038.6 (Jul. 22, 2022).
Japanese Patent Office, International Search Report in International Patent Application No. PCT/JP2019/049806 (Feb. 10, 2020).
Japanese Patent Office, International Search Report in International Patent Application No. PCT/JP2019/049807 (Feb. 10, 2020).
Japanese Patent Office, International Search Report in International Patent Application No. PCT/JP2019/049808 (Feb. 10, 2020).
Japanese Patent Office, International Search Report in International Patent Application No. PCT/JP2019/049809 (Feb. 10, 2020).
Japanese Patent Office, International Search Report in International Patent Application No. PCT/JP2019/049810 (Feb. 10, 2020).
European Patent Office, Extended European Search Report in European Patent Application No. 19901456.4 (Aug. 18, 2022).
European Patent Office, Extended European Search Report in European Patent Application No. 19903250.9 (Aug. 18, 2022).
European Patent Office, Extended European Search Report in European Patent Application No. 19904532.9 (Aug. 18, 2022).
European Patent Office, Extended European Search Report in European Patent Application No. 19905465.1 (Aug. 25, 2022).
European Patent Office, Extended European Search Report in European Patent Application No. 19906094.8 (Aug. 25, 2022).
Intellectual Property India, Hearing Notice in Indian Patent Application No. 202147031787 (Sep. 5, 2023).
Intellectual Property India, Hearing Notice in Indian Patent Application No. 202147031803 (Feb. 1, 2024).
U.S. Appl. No. 17/417,831, filed Jun. 23, 2021.
U.S. Appl. No. 17/417,849, filed Jun. 24, 2021.
U.S. Appl. No. 17/417,891, filed Jun. 24, 2021.
U.S. Appl. No. 17/417,903, filed Jun. 24, 2021.
Taiwan Intellectual Property Office, Office Action in Taiwanese Patent Application No. 113101002 (May 31, 2024).

* cited by examiner

BIAXIALLY ORIENTED POLYPROPYLENE FILM

CROSS-REFERENCE TO RELATED APPLICATIONS

This patent application is the U.S. national phase of International Patent Application No. PCT/JP2019/049809, filed Dec. 19, 2019, which claims the benefit of Japanese Patent Application No. 2018-247985, filed Dec. 28, 2018, and Japanese Patent Application No. 2019-195472, filed Oct. 28, 2019, which are incorporated by reference in their entireties herein.

TECHNICAL FIELD

The present invention relates to a biaxially oriented polypropylene film having excellent stiffness and heat resistance. More specifically, the present invention relates to a biaxially oriented polypropylene film that easily maintains a bag shape when being made into a packaging bag, has fewer wrinkles when being heat-sealed, and thus is suitable for use for a packaging bag.

BACKGROUND ART

A biaxially oriented polypropylene film is used for packaging and industrial applications since it has moisture resistance and also has the required stiffness and heat resistance. In recent years, as the applications for which the biaxially oriented polypropylene film is used have expanded, higher performance has been required, and in particular, improvement in stiffness is expected. In consideration of the environment, the biaxially oriented polypropylene film is also required to maintain the strength even if the volume thereof is reduced (the film thickness is decreased). For that purpose, it is indispensable to significantly improve the stiffness. As a means for improving the stiffness, it is known that the crystallinity and melting point of a polypropylene resin are improved by improving the catalyst and the process technology at the time of polymerization of the polypropylene resin. Despite such improvements, no biaxially oriented polypropylene film having sufficient stiffness has existed so far.

In a process for producing a biaxially oriented polypropylene film, a method in which, after stretching in a width direction, a first stage heat treatment is performed while relaxing a film at a temperature equal to or lower than that at the time of stretching in the width direction, and a second stage heat treatment is performed at a temperature between the temperature of the first stage and the temperature of stretching in the width direction (see, for example, Reference Literature 1, etc.) and a method in which, after stretching in a width direction, stretching in a longitudinal direction is performed (see, for example, Reference Literature 2, etc.) have been proposed. Although the film described in Patent Literature 2 has excellent stiffness, after the film is heat-sealed, wrinkles are likely to occur in the sealed portion, so that the film has inferior heat resistance. In addition, the degree of orientation of the film described in Patent Literature 1 is low, and the stiffness of the film is not sufficient.

CITATION LIST

Patent Literature

[PTL 1] International Publication No. WO2016/182003
[PTL 2] Japanese Laid-Open Patent Publication No. 2013-177645

SUMMARY OF THE INVENTION

Problems to be Solved by the Invention

An object of the present invention is to solve the above-described problems. That is, the object of the present invention pertains to a biaxially oriented polypropylene film having excellent stiffness and heat resistance at a high temperature of 150° C. More specifically, the object of the present invention is to provide a biaxially oriented polypropylene film that easily maintains a bag shape when being made into a packaging bag and has fewer wrinkles in a sealed portion and a portion around the sealed portion when being heat-sealed.

Solution to the Problems

The present inventors have conducted earnest studies in order to achieve the object. As a result, the present inventors have found that a biaxially oriented polypropylene film having excellent processability and heat resistance at a high temperature of 150° C. can be obtained by making a biaxially oriented polypropylene film, wherein a maximum elongation of the biaxially oriented polypropylene film at 150° C. or lower measured by a thermomechanical analyzer (TMA) is not larger than 1.5 mm in a longitudinal direction and not larger than 0.1 mm in a width direction, and a heat shrinkage rate of the biaxially oriented polypropylene film at 150° ° C. is not higher than 10% in the longitudinal direction and not higher than 30% in the width direction.

In this case, it is suitable that a heat shrinkage rate of the biaxially oriented polypropylene film at 120° C. is not higher than 2.0% in the longitudinal direction and not higher than 5.0% in the width direction, and the heat shrinkage rate at 120° C. in the longitudinal direction is lower than the heat shrinkage rate at 120° C. in the width direction.

In this case, it is suitable that a refractive index Ny in the width direction of the biaxially oriented polypropylene film is not lower than 1.5230, and ΔNy of the biaxially oriented polypropylene film is not lower than 0.0220.

Further, in this case, it is suitable that the biaxially oriented polypropylene film has a haze of 5.0% or lower.

Furthermore, in this case, it is suitable that a polypropylene resin forming the biaxially oriented polypropylene film has a mesopentad fraction of 97.0% or higher.

Furthermore, in this case, it is suitable that the polypropylene resin forming the biaxially oriented polypropylene film has a crystallization temperature of 105° C. or higher and a melting point of 160° ° C. or higher.

Furthermore, in this case, it is suitable that the polypropylene resin forming the biaxially oriented polypropylene film has a melt flow rate of 4.0 g/10 minutes or higher.

Furthermore, in this case, it is suitable that an amount of a component having a molecular weight of 100,000 or lower in the polypropylene resin forming the biaxially oriented polypropylene film is not smaller than 35% by mass.

Furthermore, in this case, it is suitable that the biaxially oriented polypropylene film has an orientation degree of 0.85 or higher.

Effect of the Invention

Since the biaxially oriented polypropylene film of the present invention has high stiffness and also has excellent heat resistance at a high temperature of 150° C., the biaxially oriented polypropylene film easily maintains a bag shape when being made into a packaging bag, and has fewer wrinkles in a sealed portion when being heat-sealed. Thus, a biaxially oriented polypropylene film that is suitable for use for a packaging bag can be obtained. In addition, since the biaxially oriented polypropylene film has excellent stiffness, the strength of the film can be maintained even when the thickness of the film is decreased, and the film is suitable for use for applications that require higher stiffness.

DESCRIPTION OF EMBODIMENTS

Hereinafter, the biaxially oriented polypropylene film of the present invention will be described in more detail.

The biaxially oriented polypropylene film of the present invention is made of a polypropylene resin composition containing a polypropylene resin as a main component. The "main component" means that the proportion of the polypropylene resin in the polypropylene resin composition is not lower than 90% by mass, and the proportion is more preferably not lower than 93% by mass, further preferably not lower than 95% by mass, and particularly preferably not lower than 97% by mass.

(Polypropylene Resin)

As the polypropylene resin used in the present invention, a polypropylene homopolymer or a copolymer of ethylene and/or an α-olefin having 4 or more carbon atoms can be used. A propylene homopolymer that substantially does not contain ethylene and/or an olefin having 4 or more carbon atoms is preferable, and, even in the case where ethylene and/or an olefin component having 4 or more carbon atoms is contained, the amount of the ethylene and/or the α-olefin component having 4 or more carbon atoms is preferably not larger than 1 mol %. The upper limit of the amount of the component is more preferably 0.5 mol %, further preferably 0.3 mol %, and particularly preferably 0.1 mol %. When the amount of the component is in the above range, the crystallinity is likely to be improved. Examples of the α-olefin component having 4 or more carbon atoms and included in such a copolymer include 1-butene, 1-pentene, 3-methylpentene-1, 3-methylbutene-1, 1-hexene, 4-methylpentene-1, 5-ethylhexene-1, 1-octene, 1-decene, 1-dodecene, 1-tetradecene, 1-hexadecene, 1-heptadecene, 1-octadecene, and 1-eicosene.

As the polypropylene resin, two or more different polypropylene homopolymers or copolymers of ethylene and/or an α olefin having 4 or more carbon atoms, or a mixture thereof can be used.

(Stereoregularity)

The mesopentad fraction ([mmmm]%), which is an index of the stereoregularity of the polypropylene resin used in the present invention, is preferably in the range of 97.0 to 99.9%, more preferably in the range of 97.5 to 99.7%, further preferably in the range of 98.0 to 99.5%, and particularly preferably in the range of 98.5 to 99.3%.

When the mesopentad fraction is not lower than 97.0%, the crystallinity of the polypropylene resin is increased, the melting point, the degree of crystallinity, and the degree of crystal orientation of crystals in the film are improved, and stiffness and heat resistance at high temperature are easily ensured. When the mesopentad fraction is not higher than 99.9%, the cost can be easily reduced in terms of polypropylene production, and breaking is less likely to occur during film formation. The mesopentad fraction is more preferably not higher than 99.5%. The mesopentad fraction is measured by a nuclear magnetic resonance method (so-called NMR method).

In order to set the mesopentad fraction of the polypropylene resin to be in the above range, a method in which the obtained polypropylene resin powder is washed with a solvent such as n-heptane, a method in which selection of a catalyst and/or co-catalyst and selection of components of the polypropylene resin composition are made as appropriate, etc., are preferably adopted.

(Melting Temperature)

The lower limit of the melting temperature (Tm), measured by a DSC, of the polypropylene resin included in the biaxially oriented polypropylene film of the present invention is preferably 160°C, more preferably 161°C, further preferably 162° C., and even further preferably 163°C. When the Tm is not lower than 160° C., stiffness and heat resistance at high temperature are easily ensured.

The upper limit of the Tm is preferably 170° C., more preferably, 169° C., further preferably 168° C., even further preferably 167°C, and particularly preferably 166° C. When the Tm is not higher than 170° C., an increase in cost is easily suppressed in terms of polypropylene production, and breaking is less likely to occur during film formation. The melting temperature can be further increased by blending a crystal nucleating agent into the above-described polypropylene resin.

The Tm is the main peak temperature of an endothermic peak associated with melting that is observed when 1 to 10 mg of a sample is put into an aluminum pan, the aluminum pan is set in a differential scanning calorimeter (DSC), the sample is melted at 230° C. for 5 minutes in a nitrogen atmosphere, the temperature is decreased to 30° C. at a scanning rate of −10° C./min, then the sample is retained for 5 minutes, and the temperature is increased at a scanning rate of 10° C./min.

(Crystallization Temperature)

The lower limit of the crystallization temperature (Tc), measured by a DSC, of the polypropylene resin included in the biaxially oriented polypropylene film of the present invention is 105° C., preferably 108°C, and more preferably 110° C. When the Tc is not lower than 105° C., crystallization easily proceeds in stretching in a width direction and a subsequent cooling step, so that stiffness and heat resistance at high temperature are easily ensured.

The upper limit of the Tc is preferably 135°C, more preferably 133° C., further preferably 132°C, even further preferably 130° C., particularly preferably 128° C., and most preferably 127° C. When the Tc is not higher than 135°C, the cost is less likely to be increased in terms of polypropylene production, and breaking is less likely to occur during film formation.

The Tc is the main peak temperature of an exothermic peak that is observed when 1 to 10 mg of a sample is put into an aluminum pan, the aluminum pan is set in a DSC, the sample is melted at 230° C. for 5 minutes in a nitrogen atmosphere, and the temperature is decreased to 30° C. at a scanning rate of −10° C./min.

The crystallization temperature can be further increased by blending a crystal nucleating agent into the above-described polypropylene resin.

(Melt Flow Rate)

The melt flow rate (MFR) of the polypropylene resin included in the biaxially oriented polypropylene film of the present invention is preferably 4.0 to 30 g/10 minutes, more preferably 4.5 to 25 g/10 minutes, further preferably 4.8 to 22 g/10 minutes, particularly preferably 5.0 to 20 g/10 minutes, and most preferably 6.0 to 20 g/10 minutes, when being measured according to the condition M (230° C., 2.16 kgf) of JIS K 7210 (1995).

When the melt flow rate (MFR) of the polypropylene resin is not lower than 4.0 g/10 minutes, a biaxially oriented polypropylene film having low heat shrinkage is easily obtained.

Moreover, when the melt flow rate (MFR) of the polypropylene resin is not higher than 30 g/10 minutes, the film formability is easily maintained.

From the viewpoint of film characteristics, the lower limit of the melt flow rate (MFR) (230° C., 2.16 kgf) of the polypropylene resin included in the film is preferably 5.0 g/10 minutes, more preferably 5.5 g/10 minutes, further preferably 6.0 g/10 minutes, particularly preferably 6.3 g/10 minutes, and most preferably 6.5 g/10 minutes.

When the melt flow rate (MFR) of the polypropylene resin is not lower than 5.0 g/10 minutes, the amount of a low-molecular weight component of the polypropylene resin included in the film is increased. Thus, by adopting a width-direction stretching step in a later-described film formation process, in addition to further promoting orientation crystallization of the polypropylene resin and making it easy to further increase the degree of crystallinity in the film, the polypropylene molecular chains in the amorphous part are less entangled with each other, so that the heat resistance is easily increased further.

In order to set the melt flow rate (MFR) of the polypropylene resin to be in the above range, a method in which the average molecular weight or molecular weight distribution of the polypropylene resin is controlled, etc., are preferably adopted.

That is, the lower limit of the amount of a component having a molecular weight of 100,000 or less in a GPC integration curve of the polypropylene resin included in the film of the present invention is preferably 35% by mass, more preferably 38% by mass, further preferably 40% by mass, particularly preferably 41% by mass, and most preferably 42% by mass.

The upper limit of the amount of the component having a molecular weight of 100,000 or less in the GPC integration curve is preferably 65% by mass, more preferably 60% by mass, and further preferably 58% by mass. When the amount of the component having a molecular weight of 100,000 or less in the GPC integration curve is not larger than 65% by mass, the film strength is less likely to be decreased.

At this time, when a high-molecular weight component or a long-chain branched component having a long relaxation time is contained, it is easy to adjust the amount of the component having a molecular weight of 100,000 or less contained in the polypropylene resin without significantly changing the overall viscosity. Therefore, it is easy to improve the film formability without significantly affecting the stiffness and heat shrinkage.

(Molecular Weight Distribution)

The lower limit of mass-average molecular weight (Mw)/number-average molecular weight (Mn), which is an index of the width of the molecular weight distribution, of the polypropylene resin used in the present invention is preferably 3.5, more preferably 4.0, further preferably 4.5, and particularly preferably 5.0. The upper limit of the Mw/Mn is preferably 30, more preferably 25, further preferably 23, particularly preferably 21, and most preferably 20.

The Mw/Mn can be obtained by using gel permeation chromatography (GPC). When the Mw/Mn is in the above range, it is easy to increase the amount of the component having a molecular weight of 100,000 or less.

The molecular weight distribution of the polypropylene resin can be adjusted by polymerizing components having different molecular weights in multiple stages in a series of plants, blending components having different molecular weights offline with a kneader, blending catalysts having different performances and performing polymerization, or using a catalyst capable of achieving a desired molecular weight distribution. As for the shape of the molecular weight distribution obtained by GPC, the molecular weight distribution may be a gentle molecular weight distribution having a single peak, or may be a molecular weight distribution having a plurality of peaks and shoulders, in a GPC chart in which the logarithm of molecular weight (M) (log M) is plotted on the horizontal axis and a differential distribution value (weight fraction per log M) is plotted on the vertical axis.

(Method for Forming Biaxially Oriented Polypropylene Film)

The biaxially oriented polypropylene film of the present invention can be preferably obtained by producing an unstretched sheet made of the polypropylene resin composition containing the above-described polypropylene resin as a main component, and biaxially stretching the unstretched sheet. As the method for the biaxial stretching, any of an inflation simultaneous biaxial stretching method, a tenter simultaneous biaxial stretching method, and a tenter sequential biaxial stretching method can be adopted, but a tenter sequential biaxial stretching method is preferably adopted from the viewpoint of film formation stability and thickness uniformity. In particular, stretching is preferably performed in a width direction after stretching in a longitudinal direction, but a method in which stretching is performed in the longitudinal direction after stretching in the width direction may be adopted.

Next, a method for producing the biaxially oriented polypropylene film of the present invention will be described below, but the present invention is not necessarily limited thereto. In the biaxially oriented polypropylene film of the present invention, a layer having another function may be laminated on at least one surface thereof. Such a layer may be laminated on one surface or both surfaces. At that time, the above-described polypropylene resin composition may be adopted as the resin composition of the other one layer or the central layer. In addition, a composition different from the above-described polypropylene resin composition may be used. The number of layers to be laminated may be one, two, or three or more per one surface, but is preferably one or two from the viewpoint of production. As the method for the lamination, for example, coextrusion by a feed block method or a multi-manifold method is preferable. In particular, for the purpose of improving the processability of the biaxially oriented polypropylene film, a resin layer having heat sealability can be laminated as long as the characteristics are not deteriorated.

Hereafter, the case where a tenter sequential biaxial stretching method is adopted for the case of a single layer will be described.

First, the resin composition containing the polypropylene resin is heated and melted by a single screw or twin-screw extruder, extruded into a sheet from a T-die, and brought into contact with a cooling roll to be cooled and solidified. For the purpose of promoting solidification, preferably, the sheet cooled by the cooling roll may be further cooled by immersing the sheet in a water tank.

Then, the sheet is stretched in the longitudinal direction with two pairs of heated stretching rolls by increasing the number of rotations of the rear stretching rolls, to obtain a uniaxially stretched film.

Subsequently, the uniaxially stretched film is preheated, and then stretched in the width direction at a specific temperature, while grasping an end portion of the film, by a tenter type stretching machine to obtain a biaxially stretched film. This width direction stretching step will be described in detail later.

After the width direction stretching step is completed, the biaxially stretched film is heat-treated at a specific temperature to obtain a biaxially oriented film. In the heat treatment step, the film may be relaxed in the width direction.

The biaxially oriented polypropylene film thus obtained can be subjected to, for example, a corona discharge treatment on at least one surface thereof as necessary, and then wound by a winder to obtain a film roll.

Each step will be described in detail below.
(Extrusion Step)

First, the polypropylene resin composition containing the polypropylene resin as a main component is heated and melted in the range of 200° C. to 300° C. by a single-screw or twin-screw extruder, and the sheet-shaped melted polypropylene resin composition is extruded from a T-die, and brought into contact with a cooling roll, which is made of metal, to be cooled and solidified. Preferably, the obtained unstretched sheet is further put into a water tank.

The temperature of the cooling roll or the temperatures of the cooling roll and the water tank are preferably in the range of 10° C. to the Tc. In the case of increasing the transparency of the film, the sheet is preferably cooled and solidified by a cooling roll set at a temperature in the range of 10 to 50° C. When the cooling temperature is not higher than 50° C., the transparency of the unstretched sheet is likely to be increased, and the cooling temperature is preferably not higher than 40° C. and further preferably not higher than 30° C. In order to increase the degree of crystal orientation after the sequential biaxial stretching, it may be preferable to set the cooling temperature to be 40° C. or higher. However, in the case of using a propylene homopolymer having a mesopentad fraction of 97.0% or higher as described above, the cooling temperature is preferably not higher than 40° C., for facilitating stretching in the next step and reducing the thickness unevenness, and more preferably not higher than 30° C.

The thickness of the unstretched sheet is preferably not larger than 3500 μm in terms of cooling efficiency, is further preferably not larger than 3000 μm, and can be adjusted as appropriate in accordance with the film thickness after the sequential biaxial stretching. The thickness of the unstretched sheet can be controlled on the basis of the extrusion speed of the polypropylene resin composition, the lip width of the T-die, etc.
(Longitudinal-Direction Stretching Step)

The lower limit of a longitudinal-direction stretching ratio is 3 times, more preferably 3.5 times, and particularly preferably 3.8 times. When the longitudinal-direction stretching ratio is in the above range, the strength is easily increased, and the film thickness unevenness is also reduced. The upper limit of the longitudinal-direction stretching ratio is preferably 8 times, more preferably 7.5 times, and particularly preferably 7 times. When the longitudinal direction stretching ratio is in the above range, stretching is easily performed in the width direction in the width-direction stretching step, so that the productivity is improved.

The lower limit of the longitudinal-direction stretching temperature is preferably Tm−40° C., more preferably Tm−37°C, and further preferably Tm−35° C. When the longitudinal-direction stretching temperature is in the above range, stretching in the width direction that is subsequently performed becomes easy, and the thickness unevenness is also reduced. The upper limit of the longitudinal direction stretching temperature is preferably Tm−7°C, more preferably Tm−10° C., and further preferably Tm−12°C. When the longitudinal-direction stretching temperature is in the above range, the heat shrinkage rate is easily decreased, so that the stretching does not become difficult due to adhesion to the stretching rolls, or the quality is not decreased due to an increase in surface roughness.

As for the stretching in the longitudinal direction, three or more pairs of stretching rolls may be used to perform stretching in multiple stages which are two or more stages.
(Preheating Step)

Before the width-direction stretching step, the uniaxially stretched film after the stretching in the longitudinal direction needs to be heated in the range of Tm to Tm+25° C. to soften the polypropylene resin composition. When the preheating temperature is set to be not lower than Tm, softening proceeds and the stretching in the width direction becomes easy. When the preheating temperature is set to be not higher than Tm+25° C., stiffness is easily ensured and the orientation at the time of lateral stretching proceeds. The preheating temperature is more preferably Tm+2 to Tm+22° ° C. and particularly preferably Tm+3 to Tm+20° C. Here, the maximum temperature in the preheating step is defined as the preheating temperature.
(Width-Direction Stretching Step)

A preferable method for the width direction stretching step after the preheating step is as follows.

In the width-direction stretching step, a section (first term section) in which stretching is performed at a temperature that is not lower than Tm−10° C. and not higher than the preheating temperature is provided. At this time, the start time of the first term section may be the time when the preheating temperature is reached, or may be the time when the temperature is decreased to reach a temperature lower than the preheating temperature after the preheating temperature is reached.

The lower limit of the temperature in the first term section in the width-direction stretching step is preferably Tm−9° ° C., more preferably Tm−8°C, and further preferably Tm−7°C. When the stretching temperature in the first term section is in this range, stretching unevenness is less likely to occur.

Subsequently to the first term section, a section (second term section) in which stretching is performed at a temperature that is lower than the temperature in the first term section and that is not lower than Tm−70° C. and not higher than Tm−5° C. is provided.

The upper limit of the stretching temperature in the second term section is preferably Tm−8°C and more preferably Tm−10° C. When the stretching temperature in the second term section is in this range, stiffness is easily ensured.

The lower limit of the stretching temperature in the second term section is preferably Tm−65° C., more preferably Tm−60°C, and further preferably Tm−55° C. When the stretching temperature in the second term section is in this range, the film formation is likely to be stabilized.

The film can be cooled at the end of the second term section, that is, immediately after the width direction final stretching ratio is reached. The cooling temperature at this time is preferably a temperature that is not higher than the temperature in the second term section and that is not lower than Tm−80° C. and not higher than Tm−15° C., more preferably a temperature that is not lower than Tm−80° C. and not higher than Tm−20° C., further preferably a temperature that is not lower than Tm−80° C. and not higher than Tm−30° C., and particularly preferably a temperature that is not lower than Tm−70° ° C. and not higher than Tm−40° C.

The temperature in the first term section and the temperature in the second term section can be gradually decreased, but can also be decreased stepwise or in one step, or each may be constant. When the temperatures are gradually decreased, the film is less likely to be broken, and the thickness fluctuation of the film is easily reduced. In addition, the heat shrinkage rate is easily decreased, and the film is less whitened. Thus, it is preferable to gradually decrease the temperatures.

In the width direction stretching step, the temperature can be gradually decreased from the temperature at the end of the first term section to the temperature at the start of the second term section, but can also be decreased stepwise or in one step.

The lower limit of the stretching ratio at the end of the first term section in the width-direction stretching step is preferably 4 times, more preferably 5 times, further preferably 6 times, and particularly preferably 6.5 times. The upper limit of the stretching ratio at the end of the first term section is preferably 15 times, more preferably 14 times, and further preferably 13 times.

The lower limit of the final width direction stretching ratio in the width direction stretching step is preferably 5 times, more preferably 6 times, further preferably 7 times, and particularly preferably 8 times. When the final width direction stretching ratio is not less than 5 times, the stiffness is easily increased, and the film thickness unevenness is also easily reduced.

The upper limit of the width-direction stretching ratio is preferably 20 times, more preferably 17 times, and further preferably 15 times. When the width-direction stretching ratio is not greater than 20 times, the heat shrinkage rate is easily decreased, and the film is less likely to be broken during stretching.

By using the polypropylene resin having high stereoregularity, a high melting point, and high crystallinity as described above and adopting the above-described width-direction stretching step, the molecules of the polypropylene resin are highly aligned in a main orientation direction (corresponding to the width direction in the above described width direction stretching step) even without extremely increasing the stretching ratio. Thus, the crystal orientation in the obtained biaxially oriented film is very strong, and crystals having a high melting point are likely to be generated.

Moreover, the orientation of the amorphous part between the crystals is also increased in the main orientation direction (corresponding to the width direction in the above-described width-direction stretching step) and many crystals having a high melting point exist around the amorphous part. Thus, at a temperature lower than the melting point of the crystals, the elongated polypropylene molecules in the amorphous part are less likely to be relaxed and easily maintain its tense state. Therefore, the entire biaxially oriented film can maintain high stiffness even at high temperature.

Also, notably, by adopting such a width-direction stretching step, the heat shrinkage rate at a high temperature of 150° C. is also easily decreased. The reason for this is that since many crystals having a high melting point exist around the amorphous part, the elongated polypropylene resin molecules in the amorphous part are less likely to be relaxed at a temperature lower than the melting point of the crystals, and the molecules are less entangled with each other.

More notably, the reason is also that by increasing the amount of the low-molecular weight component of the polypropylene resin, the degree of crystallinity of the film is easily increased further, and the entanglement of the polypropylene resin molecular chains in the amorphous part is further reduced to weaken the heat shrinkage stress, whereby the heat shrinkage rate can be further decreased. This can be said to be unprecedented in consideration of the fact that, in the conventional art, when either strength or heat shrinkage rate is improved, the other characteristic tends to decrease.

(Heat Treatment Step)

The biaxially stretched film can be heat-treated as necessary in order to further decrease the heat shrinkage rate. The upper limit of the heat treatment temperature is preferably Tm+10° C. and more preferably Tm+7°C. When the heat treatment temperature is set to be not higher than Tm+10° C., stiffness is easily ensured, the surface roughness of the film does not become too larger, and the film is less likely to be whitened. The lower limit of the heat treatment temperature is preferably Tm−10° ° C. and more preferably Tm−7°C. When the heat treatment temperature is lower than Tm−10° C., the heat shrinkage rate may be increased.

By adopting the above described width-direction stretching step, even when heat treatment is performed at a temperature of Tm−10° C. to Tm+10, the highly oriented crystals generated in the stretching step are less likely to be melted, and the heat shrinkage rate can be further decreased without decreasing the stiffness of the obtained film. For the purpose of adjusting the heat shrinkage rate, the film may be relaxed in the width direction during the heat treatment. The upper limit of the relaxation rate is preferably 10%. When the relaxation rate is in the above range, the film strength is less likely to be decreased, and the thickness fluctuation of the film is likely to be reduced. The upper limit of the relaxation rate is more preferably 8%, further preferably 7%, even further preferably 3%, particularly preferably 2%, and most preferably 0%.

(Film Thickness)

The thickness of the biaxially oriented polypropylene film of the present invention is set according to each application, but in order to ensure the strength of the film, the lower limit of the film thickness is preferably 2 μm, more preferably 3 μm, further preferably 4 μm, particularly preferably 8 μm, and most preferably 10 μm. When the film thickness is not smaller than 2 μm, the stiffness of the film is easily ensured. The upper limit of the film thickness is preferably 100 μm, more preferably 80 μm, further preferably 60 μm, particularly preferably 50 μm, and most preferably 40 μm. When the film thickness is not larger than 100 μm, the cooling rate of the unstretched sheet during the extrusion step is less likely to be decreased.

The biaxially oriented polypropylene film of the present invention is usually formed as a roll having a width of 2000 to 12000 mm and a length of about 1000 to 50000 m, and is wound into a film roll. Furthermore, the biaxially oriented polypropylene film is slit according to each application and is provided as a slit roll having a width of 300 to 2000 mm and a length of about 500 to 5000 m. The biaxially oriented polypropylene film of the present invention can be obtained as a longer film roll.

(Thickness Uniformity)

The lower limit of the thickness uniformity of the biaxially oriented polypropylene film of the present invention is preferably 0%, more preferably 0.1%, further preferably 0.5%, and particularly preferably 1%. The upper limit of the thickness uniformity is preferably 20%, more preferably 17%, further preferably 15%, particularly preferably 12%, and most preferably 10%. When the thickness uniformity is in the above range, defects are less likely to occur during post-processing such as coating and printing, and the biaxially oriented polypropylene film is easily used for applications that require precision.

The measurement method is as follows. A test piece of 40 mm in the width direction is cut out from a steady region where the physical properties of the film are stable in the longitudinal direction of the film, and the film thickness is continuously measured over 20000 mm using a film feeder manufactured by MIKURON k.k. (using the serial number: A90172) and a film thickness continuous measurement device (product name: K-313A wide range high-sensitivity electronic micrometer) manufactured by Anritsu Corporation, and the thickness uniformity is calculated from the following equation.

Thickness uniformity (%)=[(maximum value of thickness−minimum value of thickness)/average value of thickness]×100

(Film Characteristics)

The biaxially oriented polypropylene film of the present invention is characterized by the following characteristics. Here, the "longitudinal direction" in the biaxially oriented polypropylene film of the present invention is a direction corresponding to a flow direction in the film production process, and the "width direction" is a direction orthogonal to the flow direction in the film production process. For a polypropylene film for which a flow direction in a film production process is unknown, a direction in which the diffraction intensity of a diffraction intensity distribution obtained when wide-angle X-rays are incident on the film surface in a direction perpendicular thereto and a scattering peak derived from the (110) plane of a type crystal is scanned in the circumferential direction, is defined as the "longitudinal direction", and a direction orthogonal to this direction is defined as the "width direction".

(TMA Heating Elongation)

The upper limit of the maximum elongation at 150° C. or lower in the longitudinal direction, measured by a thermomechanical analyzer, of the biaxially oriented polypropylene film of the present invention is 1.5 mm, preferably 1.45 mm, more preferably 1.4 mm, further preferably 1.35 mm, and particularly preferably 1.3 mm. When the maximum elongation is in the above range, deformation during heat processing with a roll and printing may be small, and the processability may be improved. The lower limit of the maximum elongation at 150° C. or lower in the longitudinal direction is preferably 0.5 mm, more preferably 0.6 mm, further preferably 0.7 mm, particularly preferably 0.75 m, and most preferably 0.8 mm. When the maximum elongation is in the above range, practical production may be facilitated.

The upper limit of the maximum elongation at 150° C. or lower in the width direction is 0.1 mm, preferably 0.09 mm, more preferably 0.08 mm, further preferably 0.075 mm, and particularly preferably 0.07 mm. The lower limit of the maximum elongation at 150° C. or lower in the width direction is preferably 0.005 mm, more preferably 0.01 mm, further preferably 0.015 mm, particularly preferably 0.018 mm, and most preferably 0.2 mm. When the maximum elongation is in the above range, deformation may be made small, and the appearance may be improved.

(150° ° C. Heat Shrinkage Rate)

The upper limit of the heat shrinkage rate in the longitudinal direction at 150° C. of the biaxially oriented polypropylene film of the present invention is 10%, preferably 8.0%, and more preferably 7.0%. The upper limit of the heat shrinkage rate in the width direction at 150° C. is 30%, preferably 25%, and more preferably 20%. When the heat shrinkage rate in the longitudinal direction is not higher than 10% and the heat shrinkage rate in the width direction is not higher than 30%, wrinkles are less likely to occur during heat sealing. In particular, when the heat shrinkage rate in the longitudinal direction at 150° C. is not higher than 8.0% and the heat shrinkage rate in the width direction at 150° C. is not higher than 20%, the strain when a chuck portion is fused to an opening portion is small, so that such heat shrinkage rates are preferable. To decrease the heat shrinkage rate at 150° C., it is effective to set the lower limit of the amount of the component having a molecular weight of 100,000 or less when a gel permeation chromatography (GPC) integration curve of the polypropylene resin included in the film is measured, to be 35% by mass.

The biaxially oriented polypropylene film of the present invention more preferably has the following characteristics and structure.

(23° C. Young's Modulus)

The lower limit of the Young's modulus in the longitudinal direction at 23° C. of the biaxially oriented polypropylene film of the present invention is preferably 2.0 GPa, more preferably 2.1 GPa, further preferably 2.2 GPa, particularly preferably 2.3 GPa, and most preferably 2.4 GPa. When the Young's modulus is not lower than 2.0 GPa, the stiffness is high, so that a bag shape when the film is made into a packaging bag is easily maintained, and the film is less likely to be deformed during processing such as printing. The upper limit of the Young's modulus in the longitudinal direction is preferably 4.0 GPa, more preferably 3.8 GPa, further preferably 3.7 GPa, particularly preferably 3.6 GPa, and most preferably 3.5 GPa. When the Young's modulus is not higher than 4.0 GPa, practical production is facilitated, and the balance between the characteristics in the longitudinal direction and the width direction is easily improved.

The lower limit of the Young's modulus in the width direction at 23° C. of the biaxially oriented polypropylene film of the present invention is preferably 6.0 GPa, more preferably 6.3 GPa, further preferably 6.5 GPa, and particularly preferably 6.7 GPa. When the Young's modulus is not lower than 6.0 GPa, the stiffness is high, so that a bag shape when the film is made into a packaging bag is easily maintained, and the film is less likely to be deformed during processing such as printing. The upper limit of the Young's modulus in the width direction is preferably 15 GPa, more preferably 13 GPa, and further preferably 12 GPa. When the Young's modulus is not higher than 15 GPa, practical production is facilitated, and the balance between the characteristics in the longitudinal direction and the width direction is easily improved.

The Young's modulus can be set to be in the range by adjusting the stretching ratio or the relaxation rate, or adjusting the temperature during film formation.

(80° C. Young's Modulus)

The lower limit of the Young's modulus in the longitudinal direction at 80° C. of the biaxially oriented polypropylene film of the present invention is preferably 0.5 GPa and more preferably 0.7 GPa. When the Young's modulus is not lower than 0.5 GPa, a printing pitch shift is less likely to occur when printing ink at high temperature is transferred. The upper limit of the Young's modulus in the longitudinal direction at 80° C. is preferably 3.0 GPa and more preferably 2.5 GPa. When the Young's modulus is not lower than 3.0 GPa, practical production is facilitated.

The lower limit of the Young's modulus in the width direction at 80° C. is preferably 2.5 GPa, more preferably 2.8 GPa, and further preferably 3.0 GPa. When the Young's modulus is not lower than 2.5 GPa, a printing pitch shift is less likely to occur when printing ink at high temperature is transferred. The upper limit of the Young's modulus in the width direction at 80° C. is preferably 5.0 GPa, more preferably 4.7 GPa, and further preferably 4.5 GPa. When the Young's modulus is not higher than 5.0 GPa, practical production is facilitated.

The Young's modulus at 80° C. can be set to be in the range by adjusting the stretching ratio, the stretching temperature, or a heat setting temperature.

(Stress at 5% Elongation at 23° C.)

The lower limit of the stress at 5% elongation (F5) in the longitudinal direction at 23° C. of the biaxially oriented polypropylene film of the present invention is 40 MPa, preferably 42 MPa, more preferably 43 MPa, further preferably 44 MPa, and particularly preferably 45 MPa. When the F5 is not lower than 40 MPa, the stiffness is high, so that a bag shape when the film is made into a packaging bag is easily maintained, and the film is less likely to be deformed during processing such as printing. The upper limit of the F5 in the longitudinal direction is preferably 70 MPa, more preferably 65 MPa, further preferably 62 MPa, particularly preferably 61 MPa, and most preferably 60 MPa. When the F5 is not higher than 70 MPa, practical production is facilitated, and the longitudinal-width balance is easily improved.

The lower limit of the F5 in the width direction at 23° C. of the biaxially oriented polypropylene film of the present invention is 160 MPa, preferably 165 MPa, more preferably 168 MPa, and further preferably 170 MPa. When the F5 is not lower than 160 MPa, the stiffness is high, so that a bag shape when the film is made into a packaging bag is easily maintained, and the film is less likely to be deformed during processing such as printing. The upper limit of the F5 in the width direction is preferably 250 MPa, more preferably 245 MPa, and further preferably 240 MPa. When the F5 is not higher than 250 MPa, practical production is facilitated, and the longitudinal-width balance is easily improved.

The F5 can be set to be in the range by adjusting the stretching ratio or relaxation rate, or adjusting the temperature during film formation.

(Stress at 5% Elongation at 80° C.)

The lower limit of the stress at 5% elongation (F5) in the longitudinal direction at 80° C. of the biaxially oriented polypropylene film of the present invention is 15 MPa, preferably 17 MPa, more preferably 19 MPa, and further preferably 20 MPa. When the F5 is not lower than 15 MPa, the stiffness is high, so that a bag shape when the film is made into a packaging bag is easily maintained, and the film is less likely to be deformed during processing such as printing. The upper limit of the F5 in the longitudinal direction at 80° C. is preferably 40 MPa, more preferably 35 MPa, further preferably 30 MPa, and particularly preferably 25 MPa. When the F5 is not higher than 40 MPa, practical production is facilitated, and the longitudinal-width balance is easily improved.

The lower limit of the F5 in the width direction at 80° C. of the biaxially oriented polypropylene film of the present invention is 75 MPa, preferably 80 MPa, more preferably 85 MPa, further preferably 90 MPa, and particularly preferably 95 MPa. When the F5 is not lower than 75 MPa, the stiffness is high, so that a bag shape when the film is made into a packaging bag is easily maintained, and the film is less likely to be deformed during processing such as printing. The upper limit of the F5 in the width direction at 80° C. is preferably 150 MPa, more preferably 140 MPa, and further preferably 130 MPa. When the F5 is not higher than 140 MPa, practical production is facilitated, and the longitudinal-width balance is easily improved.

The F5 at 80° ° C. can be set to be in the range by adjusting the stretching ratio or the relaxation rate, or adjusting the temperature during film formation.

(120° ° C. Heat Shrinkage Rate)

The upper limit of the heat shrinkage rate in the longitudinal direction at 120° C. of the biaxially oriented polypropylene film of the present invention is preferably 2.0%, more preferably 1.7%, and further preferably 1.5%. When the heat shrinkage rate is not higher than 2.0%, a printing pitch shift is less likely to occur when printing ink is transferred. The upper limit of the heat shrinkage rate in the width direction at 120° C. is 5.0%, preferably 4.5%, and more preferably 4.0%. When the heat shrinkage rate is not higher than 5.0%, wrinkles are less likely to occur during heat sealing.

When the heat shrinkage rate in the longitudinal direction at 120° C. is lower than the heat shrinkage rate in the width direction at 120° C., a printing pitch shift is further less likely to occur when printing ink is transferred. The heat shrinkage rate at 120° C. and the balance between the heat shrinkage rates in the longitudinal direction and the width direction can be set to be in the ranges by adjusting the stretching ratio, the stretching temperature, or the heat setting temperature.

(Refractive Index)

The lower limit of the refractive index (Nx) in the longitudinal direction of the biaxially oriented polypropylene film of the present invention is preferably 1.4950, more preferably 1.4970, and further preferably 1.4980. When the refractive index (Nx) is not lower than 1.4950, the stiffness of the film is easily increased. The upper limit of the refractive index (Nx) in the longitudinal direction is preferably 1.5100, more preferably 1.5070, and further preferably 1.5050. When the refractive index (Nx) is not higher than 1.5100, the balance between the characteristics in the longitudinal direction and the width direction of the film is likely to be excellent.

The lower limit of the refractive index (Ny) in the width direction of the biaxially oriented polypropylene film of the present invention is 1.5230, preferably 1.5235, and more preferably 1.5240. When the refractive index (Ny) is not lower than 1.5230, the stiffness of the film is easily increased. The upper limit of the refractive index (Ny) in the width direction is preferably 1.5280, more preferably 1.5275, and further preferably 1.5270. When the refractive index (Ny) is not higher than 1.5280, the balance between the characteristics in the longitudinal direction and the width direction of the film is likely to be excellent.

The lower limit of the refractive index (Nz) in the thickness direction of the biaxially oriented polypropylene film of the present invention is preferably 1.4960, more preferably 1.4965, and further preferably 1.4970. When the refractive index (Nz) is not lower than 1.4960, the stiffness of the film is easily increased. The upper limit of the refractive index (Nz) in the thickness direction is preferably 1.5020, more preferably 1.5015, and further preferably 1.5010. When the refractive index (Nz) is not higher than 1.5020, the heat resistance of the film is easily increased.

The refractive index can be set to be in the range by adjusting the stretching ratio, the stretching temperature, or the heat setting temperature.

(ΔNy)

The lower limit of the ΔNy of the biaxially oriented polypropylene film of the present invention is 0.0220, preferably 0.0225, more preferably 0.0228, and further preferably 0.0230. When the ΔNy is not lower than 0.0220, the stiffness of the film is likely to be increased. The upper limit of the ΔNy, as a realistic value, is preferably 0.0270, more preferably 0.0265, further preferably 0.0262, and particularly preferably 0.0260. When the ΔNy is not higher than 0.0270, the thickness unevenness is also likely to be good. The ΔNy can be set to be in the range by adjusting the stretching ratio, the stretching temperature, or the heat setting temperature of the film.

The ΔNy is calculated by the following equation with the refractive indexes along the longitudinal direction, the width direction, and the thickness direction of the film as Nx, Ny, and Nz, respectively, and means the degree of orientation in the width direction with respect to the entire orientation in the longitudinal direction, the width direction, and the thickness direction of the film.

$$\Delta Ny = Ny - [(Nx+Nz)/2]$$

(Plane Orientation Coefficient)

The lower limit of the plane orientation coefficient (ΔP) of the biaxially oriented polypropylene film of the present invention is preferably 0.0135, more preferably 0.0138, and further preferably 0.0140. When the plane orientation coefficient is not lower than 0.0135, the balance in the surface direction of the film is good, and the thickness unevenness is also good. The upper limit of the plane orientation coefficient (ΔP), as a realistic value, is preferably 0.0155, more preferably 0.0152, and further preferably 0.0150. When the plane orientation coefficient (ΔP) is not higher than 0.0155, the heat resistance at high temperature is likely to be excellent. The plane orientation coefficient (ΔP) can be set to be in the range by adjusting the stretching ratio, the stretching temperature, or the heat setting temperature.

Moreover, the plane orientation coefficient (ΔP) is calculated using (formula) [(Nx+Ny)/2]−Nz.

(Haze)

The upper limit of the haze of the biaxially oriented polypropylene film of the present invention is preferably 5.0%, more preferably 4.5%, further preferably 4.0%, particularly preferably 3.5%, and most preferably 3.0%. When the haze is not higher than 5.0%, the biaxially oriented polypropylene film is easily used for applications that require transparency. The lower limit of the haze, as a realistic value, is preferably 0.1%, more preferably 0.2%, further preferably 0.3%, and particularly preferably 0.4%. When the haze is not lower than 0.1%, the biaxially oriented polypropylene film is easily produced. The haze can be set to be in the range by adjusting the cooling roll (CR) temperature, the width direction stretching temperature, the preheating temperature before tenter stretching in the width direction, the width-direction stretching temperature, or the heat setting temperature, or the amount of the component having a molecular weight of 100,000 or less in the polypropylene resin, but may be increased by adding an antiblocking agent or providing a seal layer.

(Half Width of Diffraction Peak Derived from Oriented Crystals)

In the azimuth dependence of a scattering peak of the (110) plane of polypropylene α-type crystal, obtained through measurement with wide-angle X rays incident perpendicularly on the film surface, of the biaxially oriented polypropylene film of the present invention, the upper limit of the half width (Wh) of a diffraction peak derived from the oriented crystals in the width direction of the film is preferably 27°, more preferably 26°, further preferably 25°, particularly preferably 24°, and most preferably 23°.

The lower limit of the Wh is preferably 13°, more preferably 14°, and further preferably 15°. When the half width (Wh) is not larger than 27°, the stiffness of the film is easily increased.

(Degree of X-Ray Orientation)

The lower limit of the degree of X-ray orientation calculated by the following equation from the Wh of the biaxially oriented polypropylene film of the present invention is preferably 0.85, more preferably 0.855, and further preferably 0.861. When the degree of X-ray orientation is set to be not lower than 0.85, the stiffness is easily increased.

$$\text{Degree of X-ray orientation} = (180 - Wh)/180$$

The upper limit of the degree of X-ray orientation is preferably 0.928, more preferably 0.922, and further preferably 0.917. When the degree of X-ray orientation is set to be not higher than 0.928, the film formation is likely to be stabilized.

(Practical Characteristics of Film)

The practical characteristics of the biaxially oriented polypropylene film of the present invention will be described.

(Tensile Breaking Strength)

The lower limit of the tensile breaking strength in the longitudinal direction of the biaxially oriented polypropylene film of the present invention is preferably 90 MPa, more preferably 95 MPa, and further preferably 100 MPa. When the tensile breaking strength is not lower than 90 MPa, a printing pitch shift is less likely to occur when printing ink is transferred, and the durability of a packaging bag is likely to be excellent. The upper limit of the tensile breaking strength in the longitudinal direction, as a realistic value, is preferably 200 MPa, more preferably 190 MPa, and further preferably 180 MPa. When the tensile breaking strength is not higher than 200 MPa, film breakage and packaging bag breakage are less likely to occur.

The lower limit of the tensile breaking strength in the width direction of the biaxially oriented polypropylene film of the present invention is preferably 320 MPa, more preferably 340 MPa, and further preferably 350 MPa. When the tensile breaking strength is not lower than 320 MPa, a printing pitch shift is less likely to occur when printing ink is transferred, and the durability of a packaging bag is likely to be excellent. The upper limit of the tensile breaking strength in the width direction, as a realistic value, is preferably 500 MPa, more preferably 480 MPa, and further preferably 470 MPa. When the tensile breaking strength is not higher than 500 MPa, film breakage and packaging bag breakage are less likely to occur.

The tensile breaking strength can be set to be in the range by adjusting the stretching ratio, the stretching temperature, or the heat setting temperature.

(Tensile Elongation at Break)

The lower limit of the tensile elongation at break in the longitudinal direction of the biaxially oriented polypropylene film of the present invention is preferably 50%, more preferably 55%, and further preferably 60%. When the tensile elongation at break is not lower than 50%, film breakage and packaging bag breakage are less likely to occur. The upper limit of the tensile elongation at break in the longitudinal direction, as a realistic value, is preferably 230%, more preferably 220%, and further preferably 210%. When the tensile elongation at break is not higher than 230%, a printing pitch shift is less likely to occur when printing ink is transferred, and the durability of a packaging bag is likely to be excellent.

The lower limit of the tensile elongation at break in the width direction of the biaxially oriented polypropylene film of the present invention is preferably 10%, more preferably 15%, and further preferably 17%. When the tensile elongation at break is not lower than 10%, film breakage and packaging bag breakage are less likely to occur. The upper limit of the tensile elongation at break in the width direction is preferably 60%, more preferably 55%, and further preferably 50%. When the tensile elongation at break is not higher than 60%, a printing pitch shift is less likely to occur when printing ink is transferred, and the durability of a packaging bag is likely to be excellent.

The tensile elongation at break can be set to be in the range by adjusting the stretching ratio, the stretching temperature, or the heat setting temperature.

(Bending Resistance)

The lower limit of the bending resistance in the longitudinal direction at 23° C. of the biaxially oriented polypropylene film of the present invention is preferably 0.3 mN cm, more preferably 0.33 mN cm, and further preferably 0.35 mN cm. When the bending resistance is not lower than 0.3 mN cm, the film can be made thinner, and the film is suitable for applications that require stiffness. The lower limit of the bending resistance in the width direction is preferably 0.5 mN cm, more preferably 0.55 mN cm, and further preferably 0.6 mN cm. When the bending resistance is not lower than 0.5 mN cm, the film can be made thinner, and the film is suitable for applications that require stiffness.

(Loop Stiffness Stress)

The lower limit of the loop stiffness stress S (mN) in the longitudinal direction at 23° ° C. of the biaxially oriented polypropylene film of the present invention is preferably $0.00020 \times t^3$, more preferably $0.00025 \times t^3$, further preferably $0.00030 \times t^3$, and particularly preferably $0.00035 \times t^3$, when the thickness of the biaxially oriented polypropylene film is denoted by t (μm). When the loop stiffness stress S (mN) is not lower than $0.00020 \times t^3$, the shape of a package is easily maintained.

The upper limit of the loop stiffness stress S (mN) in the longitudinal direction at 23° C. is preferably $0.00080 \times t^3$, more preferably $0.00075 \times t^3$, further preferably $0.00072 \times t^3$, and particularly preferably $0.00070 \times t^3$. When the loop stiffness stress S (mN) is not higher than $0.00080 \times t^3$, it is easy to practically produce the film.

The lower limit of the loop stiffness stress S (mN) in the width direction at 23° C. of the biaxially oriented polypropylene film of the present invention is preferably $0.0010 \times t^3$, more preferably $0.0011 \times t^3$, further preferably $0.0012 \times t^3$, and particularly preferably $0.0013 \times t^3$, when the thickness of the biaxially oriented polypropylene film is denoted by t (μm). When the loop stiffness stress S (mN) is not lower than $0.0010 \times t^3$, the shape of a package is easily maintained.

The upper limit of the loop stiffness stress S (mN) in the width direction at 23° C. is preferably $0.0020 \times t^3$, more preferably $0.0019 \times t^3$, further preferably $0.0018 \times t^3$, and particularly preferably $0.0017 \times t^3$. When the loop stiffness stress S (mN) is not higher than $0.0020 \times t^3$, it is easy to practically produce the film.

The loop stiffness stress is an index representing the stiffness of the film, and also depends on the thickness of the film. The measurement method therefor is as follows. Two strips of 110 mm×25.4 mm were cut out, with the longitudinal direction of the film as the long axis of the strip (loop direction) or the width direction of the film as the long axis of the strip (loop direction). A measurement loop in which one surface of the film is the inner surface of the loop and a measurement loop in which the other surface of the film is the inner surface of the loop were produced by pinching these strips with clips such that the long axes of the strips were the longitudinal direction and the width direction of the film, respectively. The measurement loop in which the long axis of the strip is the longitudinal direction of the film was set on the chuck part of the loop stiffness tester DA manufactured by Toyo Seiki Seisaku sho, Ltd., in a state where the width direction was vertical, the clip was removed, and a loop stiffness stress was measured with a chuck interval of 50 mm, a pushing depth of 15 mm, and a compression rate of 3.3 mm/sec.

In the measurement, the loop stiffness stress and the thickness of the measurement loop in which the one surface of the film is the inner surface of the loop were measured five times, and then the loop stiffness stress and the thickness of the measurement loop in which the other surface of the film is the inner surface of the loop were also measured five times. Using data of the total of 10 measurements, the cube of the thickness (μm) of each test piece was plotted on the horizontal axis, and the loop stiffness stress (mN) of each test piece was plotted on the vertical axis, and the plotted line was approximated with a straight line having an intercept of 0 to obtain a gradient a thereof. The gradient a means a characteristic value specific to the film that does not depend on the thickness which determines the stiffness. The gradient a was used as an evaluation value of stiffness. The measurement loop in which the long axis of the strip is the width direction of the film was also measured in the same manner.

(Wrinkles During Heat Sealing)

To form a bag for packaging food, a pre-made bag is filled with contents and heated to melt and fuse the film, thereby hermetically sealing the bag. In many cases, the same procedure is also performed when making a bag while filling the bag with food. Usually, a sealant film made of polyethylene, polypropylene, or the like is laminated on a base film, and the surfaces of the sealant film are fused to each other. As for a heating method, pressure is applied from the base film side with a heating plate to hold the film to seal the film, but the sealing width is often about 10 mm. At this time, the base film is also heated, and the shrinkage at that time causes wrinkles. For the durability of the bag, it is better to have fewer wrinkles, and in order to increase purchasing motivation, it is also better to have fewer wrinkles. The sealing temperature may be about 120° C., but in order to increase the bag-making processing speed, the sealing temperature is required to be higher. Even in this case, the shrinkage is preferably small. In the case of fusing a chuck to the opening portion of the bag, sealing at a higher temperature is required.

(Printing Pitch Shift)

As for the structure of a packaging film, as a basic structure, the packaging film is often composed of a laminated film of a printed base film and a sealant film. For producing a bag, a bag making machine is used, and various bag making machines are used for three-sided bags, standing bags, gusset bags, etc. It is considered that a printing pitch shift occurs since the base material of the film expands and contracts due to tension and heat being applied to the film during a printing step. Eliminating defective products due to a printing pitch shift is important in terms of effective use of resources, and is also important in order to increase purchasing motivation.

(Film Processing)

The biaxially oriented polypropylene film of the present invention can be printed by letterpress printing, lithographic printing, intaglio printing, stencil printing, or transfer printing, depending on the application.

Moreover, an unstretched sheet, a uniaxially stretched film, or a biaxially stretched film each made of a low density polyethylene, a linear low-density polyethylene, an ethylene vinyl acetate copolymer, polypropylene, or polyester can be attached as a sealant film, and the biaxially oriented polypropylene film can be used as a laminated body to which heat sealability is imparted. Furthermore, in the case of enhancing the gas barrier properties and heat resistance, an unstretched sheet, a uniaxially stretched film, or a biaxially stretched film each made of aluminum foil, polyvinylidene chloride, nylon, an ethylene-vinyl alcohol copolymer, or polyvinyl alcohol can be provided as an intermediate layer between the biaxially oriented polypropylene film and the sealant film. An adhesive applied by a dry lamination method or a hot melt lamination method can be used for attaching the sealant film.

In order to enhance the gas barrier properties, aluminum or an inorganic oxide can be vapor-deposited on the biaxially oriented polypropylene film, the intermediate layer film, or the sealant film. As the vapor deposition method, vacuum vapor deposition, sputtering, and ion plating methods can be adopted, and silica, alumina, or a mixture thereof is particularly preferably vacuum-deposited.

The biaxially oriented polypropylene film of the present invention can be made suitable for packaging fresh products made of plants that require high freshness such as vegetables, fruits, and flowers, for example, by setting the existence amount of an antifogging agent, such as fatty acid esters of polyhydric alcohols, amines of higher fatty acids, amides of higher fatty acids, amines of higher fatty acids, and ethylene oxide adducts of amides, in the film to be in the range of 0.2 to 5% by mass.

Moreover, as long as the effect of the present invention is not impaired, various additives for improving quality such as slipperiness and antistatic properties, for example, a lubricant such as wax and metal soap for improving productivity, a plasticizer, a processing aid, a heat stabilizer, an antioxidant, an antistatic agent, an ultraviolet absorber, etc., can also be blended.

INDUSTRIAL APPLICABILITY

Since the biaxially oriented polypropylene film of the present invention has the above-described excellent properties that have not been found in the conventional art, the biaxially oriented polypropylene film can be preferably used for a packaging bag, and the thickness of the film can be made thinner than a conventional film. Furthermore, the biaxially oriented polypropylene film of the present invention is also suitable for applications intended for use at high temperature, such as insulating films for capacitors and motors, back sheets for solar cells, barrier films for inorganic oxides, and base films for transparent conductive films such as ITO, and applications that require stiffness such as separate films. Moreover, coating and printing at high temperature can be performed by using coating agents, inks, laminating adhesives, etc., which have been conventionally difficult to use, so that production can be expected to be efficient.

EXAMPLES

Hereinafter, the present invention will be described in more detail by way of examples. The characteristics were measured and evaluated by the following methods.

(1) Melt Flow Rate

The melt flow rate (MFR) was measured at a temperature of 230° C. with a load of 2.16 kgf according to JIS K7 210.

(2) Mesopentad Fraction

The mesopentad fraction ([mmmm] %) of the polypropylene resin was measured using $^{13}$C-NMR. The mesopentad fraction was calculated according to the method described in Zambelli et al., Macromolecules, Vol. 6, p 925 (1973). The $^{13}$C-NMR measurement was carried out at 110° C., with 200 mg of a sample being dissolved in an 8:2 mixed solution of o-dichlorobenzene and heavy benzene at 135° C., using AVANCE 500 manufactured by Bruker.

(3) Number-Average Molecular Weight, Weight-Average Molecular Weight, Amount of Component Having Molecular Weight of 100,000 or Less, and Molecular Weight Distribution of Polypropylene Resin Using gel permeation chromatography (GPC), the molecular weights were determined as PP-equivalent molecular weights on the basis of monodisperse polystyrene. When the baseline was not clear, a baseline was set in a range to the lowest position of the skirt, on the high molecular weight side, of an elution peak on the high molecular weight side closest to the elution peak of the standard substance.

The GPC measurement conditions are as follows.

Equipment: HLC-8321 PC/HT (manufactured by Tosoh Corporation)
Detector: RI
Solvent: 1,2,4-trichlorobenzene+dibutylhydroxytoluene (0.05%)
Column: TSKgel guard column HHR (30) HT (7.5 mm I.D.×7.5 cm)×1+TSKgel
GMHHR-H (20) HT (7.8 mm I.D.×30 cm)×3
Flow rate: 1.0 mL/min
Injection volume: 0.3 mL
Measurement temperature: 140° C.

The number-average molecular weight (Mn) and the mass-average molecular weight (Mw) are defined by the following equations with the number of molecules (Ni) of a molecular weight (Mi) at each elution position of a GPC curve obtained via a molecular weight calibration curve, respectively.

Number-average molecular weight: $Mn = \Sigma(N_i \cdot M_i) / \Sigma N_i$

Mass-average molecular weight: $Mw = \Sigma(N_i \cdot M_i^2) / \Sigma (N_i \cdot M_i)$ Here, the molecular weight distribution can be obtained by Mw/Mn.

Moreover, the proportion of the component having a molecular weight of 100,000 or less was obtained from the integral curve of the molecular weight distribution obtained by GPC.

(4) Crystallization Temperature (Tc) and Melting Temperature (Tm)

Heat measurement was performed in a nitrogen atmosphere using the Q1000 differential scanning calorimeter manufactured by TA Instruments. Approximately 5 mg was cut out from polypropylene resin pellets and sealed in an aluminum pan for measurement. The temperature was raised to 230° ° C. and maintained for 5 minutes, then cooling was performed to 30° C. at a rate of –10° C./min, and the exothermic peak temperature was regarded as the crystallization temperature (Tc). The heat quantity of crystallization (ΔHc) was determined by setting a baseline such that the area of the exothermic peak was smoothly connected from the start of the peak to the end of the peak. The temperature was maintained as it was at 30° C. for 5 minutes, then raised to 230° C. at 10° C./min, and the main endothermic peak temperature was regarded as the melting temperature (Tm).

(5) Film Thickness

The thickness of a film was measured using Millitron 1202D manufactured by Seiko EM.

(6) Haze

The haze was measured according to JIS K7105 at 23° ° C. using NDH5000 manufactured by NIPPON DENSHOKU INDUSTRIES CO., LTD.

(7) Thermomechanical Analysis (TMA)

Using the thermomechanical analyzer TMA-60 manufactured by Shimadzu Corporation, a film sample having a width of 4 mm was set with a chuck spacing of 10 mm, and the temperature was raised from 30° ° C. to 180° C. at 20° C./min with a measurement load of 40 g, and the maximum elongation up to 150° C. was measured.

(8) Tensile Test

The tensile strength in the longitudinal direction and the width direction of a film was measured at 23° ° C. according to JIS K 7127. A sample having a size of 15 mm×200 mm was cut out from the film, and set in a tensile tester (dual column desktop tester Instron 5965, manufactured by Instron Japan Company Limited) with a chuck width of 100 mm. A tensile test was performed at a tensile rate of 200 mm/min. From the obtained strain-stress curve, a Young's modulus was obtained from the gradient of a straight line portion at the initial stage of elongation, and stress at 5% elongation (F5) was obtained. The tensile breaking strength and the tensile elongation at break were defined as the strength and the elongation at the time when the sample became broken, respectively.

By performing measurement in a thermostat bath at 80° C., a Young's modulus and F5 at 80° C. were obtained. In the measurement, a chuck was set in the thermostat bath preset at 80° C., and the sample was held for 1 minute after setting before the sample was measured.

(9) Heat Shrinkage Rate

The heat shrinkage rate was measured by the following method according to JIS Z 1712. A film was cut into a width of 20 mm and a length of 200 mm in the longitudinal direction and the width direction of the film, respectively, hung in a hot air oven set at 120° C. or 150° C., and heated for 5 minutes. The length after heating was measured, and the heat shrinkage rate was calculated as the ratio of the length after shrinkage to the original length.

(10) Refractive Index, ΔNy, and Plane Orientation Coefficient Measurement was performed at a wavelength of 589.3 nm and a temperature of 23° C. using an Abbe refractometer manufactured by ATAGO CO., LTD. The refractive indexes along the longitudinal direction and the width direction of a film were denoted by Nx and Ny, respectively, and the refractive index in the thickness direction was denoted by Nz. ΔNy was obtained by (formula) Ny−[(Nx+Nz)/2] using Nx, Ny, and Nz. In addition, the plane orientation coefficient (ΔP) was calculated using (formula) [(Nx+Ny)/2]−Nz.

(11) X-Ray Half Width and Degree of Orientation

Measurement was performed by a transmission method using an X-ray diffractometer (RINT2500, manufactured by Rigaku Corporation). X-rays having a wavelength of 1.5418 Å were used, and a scintillation counter was used as a detector. A sample was prepared by stacking films so as to have a thickness of 500 μm. A sample table was placed at the diffraction peak position (diffraction angle 2θ=14.1°) of the (110) plane of a-type crystal of the polypropylene resin, and the sample was rotated 360° about an axis along the thickness direction of the film to obtain the azimuth dependence of the diffraction intensity of the (110) plane. From this azimuth dependence, the half width Wh of a diffraction peak derived from the oriented crystals in the width direction of the film was obtained.

Also, the degree of X-ray orientation was calculated by the following equation using the Wh.

Degree of X-ray orientation=(180−$Wh$)/180

(12) Bending Resistance and Amount of Sagging

The bending resistance was obtained by the following procedure according to JIS L 1096 B method (slide method). A test piece of 20 mm×150 mm was prepared. The upper surfaces of a main body and a moving table of a testing machine were caused to coincide with each other, then the test piece was placed on the table of the testing machine so as to protrude by 50 mm, and a weight was installed thereon. Then, a handle was gently turned to lower the sample table, and the amount of sagging (δ) at the time when the free end of the sample was separated from the sample table was measured. The bending resistance (Br) was obtained by the following equation using the amount of sagging δ, the film thickness, the test piece size, and film density 0.91 g/cm$^3$.

Br=$WL^4$/8δ

Br: bending resistance (mN cm)
W: gravity per unit area of test piece (mN cm$^2$)
L: length of test piece (cm)
δ: amount of sagging (cm)

(13) Loop Stiffness Stress and stiffness

Ten strip-shaped test pieces of 110 mm×25.4 mm were cut out, with the longitudinal direction of the film as the long axis of the strip (loop direction) or the width direction of the film as the long axis of the strip (loop direction). A measurement loop in which one surface of the film is the inner surface of the loop and a measurement loop in which the other surface of the film is the inner surface of the loop were produced by pinching these test pieces with clips such that the long axes of the strips were the longitudinal direction and the width direction of the film, respectively. The measurement loop in which the long axis of the strip is the longitudinal direction of the film was set on the chuck part of the loop stiffness tester DA manufactured by Toyo Seiki Seisaku-sho, Ltd., in a state where the width direction was vertical, the clip was removed, and a loop stiffness stress was measured with a chuck interval of 50 mm, a pushing depth of 15 mm, and a compression rate of 3.3 mm/sec. In the measurement, the loop stiffness stress and the thickness of the measurement loop in which the one surface of the film is the inner surface of the loop were measured five times, and then the loop stiffness stress and the thickness of the measurement loop in which the other surface of the film is the inner surface of the loop were also measured five times. Using data of the total of 10 measurements, the cube of the thickness (μm) of each test piece was plotted on the horizontal axis, and the loop stiffness stress (mN) of each test piece was plotted on the vertical axis, and the plotted line was approximated with a straight line having an intercept of 0 to obtain a gradient a thereof. The gradient a was used as an evaluation value of stiffness. The measurement loop in which the long axis of the strip is the width direction of the film was also measured in the same manner.

Example 1

As a polypropylene resin, propylene homopolymer PP-1 (SUMITOMO NOBLEN FLX80E4, manufactured by SUMITOMO CHEMICAL COMPANY) having an MFR of 7.5 g/10 minutes, a Tc of 116.2° C., and a Tm of 162.5° C. was used. The polypropylene resin was extruded into a sheet from a T-die at 250° C., brought into contact with a cooling roll set at 20° C., and put into a water tank set at 20° C. as it was. Thereafter, the sheet was stretched 4.5 times in the longitudinal direction with two pairs of rolls at 145° C., then both ends were pinched with a clip, and the sheet was guided into a hot air oven and preheated at 170° C. Then, the sheet was stretched 8.2 times in total in the width direction by stretching the sheet 6 times at 160° C. as a first stage, and subsequently stretching the sheet 1.36 times at 145° C. as a second stage. Immediately after stretching in the width direction, the sheet was cooled at 100° ° C. while being held by the clip, and then heat setting was performed at 163°C. The thickness of the film thus obtained was 18.7 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Example 2

As a polypropylene resin, 80 parts by weight of PP-1 and 20 parts by weight of propylene homopolymer PP-2 (EL80F5, manufactured by SUMITOMO CHEMICAL COMPANY) having an MFR of 11 g/10 minutes, [mmmm] of 98.8%, a Tc of 116.5° C., and a Tm of 161.5° C. was blended and used. The same procedure as in Example 1 was carried out except that the stretching temperature for the longitudinal direction was 142° C., the stretching temperature for the first stage in the width direction was 162°C, and the heat setting temperature was 165° C. The thickness of the obtained film was 21.3 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Example 3

The same procedure as in Example 2 was carried out except that 3% relaxation was performed during heat setting. The thickness of the obtained film was 21.1 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Example 4

The same procedure as in Example 2 was carried out except that the stretching temperature for the longitudinal direction was 145° C. and the cooling temperature immediately after stretching in the width direction was 140° C. The thickness of the obtained film was 18.9 μm. Table 1 shows the structure of the polypropylene resin, and Table 2 shows the film formation conditions. As for the physical properties of the obtained film, the film had high stiffness as shown in Table 3.

Example 5

The same procedure as in Example 2 was carried out except that after stretching in the width direction, cooling was not performed, and heat setting was performed at 165° C. with the sheet held by the clip. The thickness of the obtained film was 19.5 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Example 6

The same procedure as in Example 2 was carried out except that the stretching temperature for the second stage in the width direction was 155° ° C. The thickness of the film thus obtained was 20.3 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Example 7

The same procedure as in Example 2 was carried out except that the longitudinal-direction stretching ratio was 4.8 times. The thickness of the obtained film was 19.1 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Example 8

The same procedure as in Example 2 was carried out except that in stretching in the width direction, the stretching ratio for the first stage was 6.6 times, the stretching ratio for the second stage was 1.5 times, and stretching was performed 9.9 times in total. The thickness of the obtained film was 20.1 μm. Table 1 shows the structure of the polypropylene resin, and Table 2 shows the film formation conditions. As for the physical properties of the obtained film, the film had high stiffness and a low heat shrinkage rate at high temperature as shown in Table 3.

Comparative Example 1

PP-1 was used as a polypropylene resin, and the polypropylene resin was extruded into a sheet from a T-die at 250° C., brought into contact with a cooling roll set at 20° C., and put into a water tank set at 20° C. as it was. Thereafter, the sheet was stretched 4.5 times in the longitudinal direction at 143°C, and was stretched 8.2 times with a preheating temperature as 170° C. and a stretching temperature as 158° C. at the time of stretching in the width direction at a tenter, and subsequently heat setting was performed at 168° C. The thickness of the obtained film was 18.6 μm. Table 1 shows the structure of the polypropylene resin, Table 2 shows the film formation conditions, and Table 3 shows the physical properties. As for the physical properties of the obtained film, the stiffness was low as shown in Table 3.

Comparative Example 2

The same procedure as in Comparative Example 1 was carried out except that 80 parts by weight of PP-1 and 20 parts by weight of PP-2 were blended and used as a polypropylene resin. The thickness of the obtained film was 20.0 μm. Table 1 shows the structure of the polypropylene resin, Table 2 shows the film formation conditions, and Table 3 shows the physical properties. As for the physical properties of the obtained film, the stiffness was low as shown in Table 3.

Comparative Example 3

As a polypropylene resin, PP-3 (FL203D, manufactured by Japan Polypropylene Corporation) having an MFR of 3 g/10 minutes, a Tc of 117.2° C., and a Tm of 160.6° C. was used. The polypropylene resin was extruded into a sheet from a T-die at 250° C., brought into contact with a cooling roll set at 20° ° C., and put into a water tank set at 20° ° C. as it was. Thereafter, the sheet was stretched 4.5 times in the longitudinal direction at 135° C., and was stretched in the width direction at a tenter with a preheating temperature as 166° C., a temperature for the first stage stretching as 155° C., a temperature for the second stage stretching as 139°C, a cooling temperature as 95° ° C., and a heat setting temperature as 158° C. The thickness of the obtained film was 19.2 μm. Table 1 shows the structure of the polypropylene resin, Table 2 shows the film formation conditions, and Table 3 shows the physical properties. As for the physical properties of the obtained film, the heat shrinkage rate at high temperature was high as shown in Table 3.

Comparative Example 4

As a polypropylene raw material, PP-4 (FS2012, manufactured by SUMITOMO CHEMICAL COMPANY) having an MFR of 2.7 g/10 minutes, a Tc of 114.7° C., and a Tm of 163.0° ° C. was used. The polypropylene raw material was extruded into a sheet from a T-die at 250° C., brought into contact with a cooling roll set at 20° C., and put into a water tank set at 20° ° C. as it was. Thereafter, the sheet was stretched 4.5 times in the longitudinal direction at 145° C., and was stretched in the width direction at a tenter with a preheating temperature as 170° C., a temperature for the first stage stretching as 160° ° C., a temperature for the second stage stretching as 145° C., a cooling temperature as 100° C., and a heat setting temperature as 163° C. The thickness of the obtained film was 21.2 μm. Table 1 shows the structure of the polypropylene resin, Table 2 shows the film formation conditions, and Table 3 shows the physical properties. As for the physical properties of the obtained film, the heat shrinkage rate at high temperature was high as shown in Table 3.

Comparative Example 5

PP-4 was used as a polypropylene resin. The polypropylene resin was extruded into a sheet from a T-die at 250° C., brought into contact with a cooling roll set at 20° ° C., and put into a water tank set at 20° ° C. as it was. Thereafter, the sheet was stretched 5.8 times in the longitudinal direction at 130° C., and then, at a tenter, the film was heated at a preheating temperature of 167°C and subsequently stretched 8.6 times in the width direction at a stretching temperature of 161°C. Thereafter, heat setting was performed at 130° C. with relaxation of 10%, and subsequently, heat setting as a second stage was performed at 140° C. The thickness of the obtained film was 13.4 μm. Table 1 shows the structure of the polypropylene resin, Table 2 shows the film formation conditions, and Table 3 shows the physical properties. As for the physical properties of the obtained film, the heat shrinkage rate at high temperature was high as shown in Table 3.

TABLE 1

|  | PP-1 | PP-2 | PP-3 | PP-4 |
|---|---|---|---|---|
| Copolymerization amount of component other than propylene (mol %) | 0 | 0 | 0 | 0 |
| MFR (g/10 minutes) | 7.5 | 11 | 3 | 2.7 |
| [mmmm] (%) | 98.9 | 98.8 | 94.8 | 98.7 |
| Tc (° C.) | 116.2 | 116.5 | 117.2 | 114.7 |
| Tm (° C.) | 162.5 | 161.5 | 160.6 | 163.0 |
| ΔHc (J/g) | 104.8 | 107.8 | 94.9 | 102.4 |
| Amount of component having molecular weight of 10,000 or less (% by mass) | 4.0 | 6.9 | 3.0 | 3.5 |
| Amount of component having a molecular weight of 100,000 or less (% by mass) | 40.5 | 53.1 | 37.1 | 30.0 |

TABLE 2

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| Raw material polypropylene resin | PP-1 | 100 | 80 | 80 | 80 | 80 | 80 | 80 | 80 | 100 | 80 | | | |
| | PP-2 | | 20 | 20 | 20 | 20 | 20 | 20 | 20 | | 20 | | | |
| | PP-3 | | | | | | | | | | | 100 | | |
| | PP-4 | | | | | | | | | | | | 100 | 100 |
| Mixed polypropylene resin | Melt flow rate (g/10 minutes) | 7.5 | 8.5 | 8.5 | 8.5 | 8.5 | 8.5 | 8.5 | 8.5 | 7.5 | 8.5 | 3 | 2.7 | 2.7 |
| | Amount of component having a molecular weight of 100,000 or less (% by mass) | 40.5 | 43.0 | 43.0 | 43.0 | 43.0 | 43.0 | 43.0 | 43.0 | 40.5 | 43.0 | 37.1 | 30.0 | 30.0 |

TABLE 2-continued

| | | | | | | | | | | | | | | |
|---|---|---|---|---|---|---|---|---|---|---|---|---|---|---|
| Extrusion step | Extrusion temperature (° C.) | 250 | 250 | 250 | 250 | 250 | 250 | 250 | 250 | 250 | 250 | 250 | 250 | 250 |
| | Cooling temperature (° C.) | 20 | 20 | 20 | 20 | 20 | 20 | 20 | 20 | 20 | 20 | 20 | 20 | 20 |
| Longitudinal-direction stretching step | Longitudinal-direction stretching temperature | 145 | 142 | 142 | 145 | 142 | 142 | 142 | 142 | 143 | 143 | 135 | 145 | 130 |
| | Longitudinal-direction stretching ratio (times) | 4.5 | 4.5 | 4.5 | 4.5 | 4.5 | 4.5 | 4.8 | 4.5 | 4.5 | 4.5 | 4.5 | 4.5 | 5.8 |
| Preheating step | Preheating temperature (° C.) | 170 | 170 | 170 | 170 | 170 | 170 | 170 | 170 | 170 | 170 | 166 | 170 | 167 |
| Width direction stretching step | Width-direction stretching temperature in first term section (° C.) | 160 | 162 | 162 | 162 | 162 | 162 | 162 | 162 | 158 | 158 | 155 | 160 | 161 |
| | Width-direction stretching ratio in first term section (times) | 6 | 6 | 6 | 6 | 6 | 6 | 6 | 6.6 | 6 | 6 | 6 | 6 | 6.2 |
| | Width-direction stretching temperature in second term section | 145 | 145 | 145 | 145 | 145 | 155 | 145 | 145 | 158 | 158 | 139 | 145 | 161 |
| | Width-direction stretching ratio in second term section (times) | 1.36 | 1.36 | 1.36 | 1.36 | 1.36 | 1.36 | 1.36 | 1.5 | 1.36 | 1.36 | 1.36 | 1.36 | 1.39 |
| | Final width-direction stretching ratio | 8.2 | 8.2 | 8.2 | 8.2 | 8.2 | 8.2 | 8.2 | 9.9 | 8.2 | 8.2 | 8.2 | 8.2 | 8.6 |
| | Temperature immediately after stretching in width direction (° C.) | 100 | 100 | 100 | 140 | — | 100 | 100 | 100 | — | — | 95 | 100 | — |
| Heat treatment step | Heat treatment temperature (° C.) | 163 | 165 | 165 | 165 | 165 | 165 | 165 | 165 | 168 | 168 | 158 | 163 | 130 |
| | Relaxation rate during heat treatment (%) | 0 | 0 | 3 | 0 | 0 | 0 | 0 | 0 | 0 | 0 | 0 | 0 | 10 |
| | Temperature during second heat treatment (° C.) | — | — | — | — | — | — | — | — | — | — | — | — | 140 |

TABLE 3

| | | Example 1 | Example 2 | Example 3 | Example 4 | Example 5 | Example 6 | Example 7 |
|---|---|---|---|---|---|---|---|---|
| Film characteristics | Thickness (μm) | 18.7 | 21.3 | 21.1 | 18.9 | 19.5 | 20.3 | 19.1 |
| | Haze (%) | 0.7 | 2.2 | 2.0 | 2.0 | 2.1 | 2.1 | 2.2 |
| | 23° C. F5 (width direction) (MPa) | 193 | 180 | 169 | 171 | 183 | 175 | 184 |
| | 23° C. F5 (longitudinal direction) (MPa) | 49 | 44 | 46 | 46 | 46 | 45 | 45 |
| | 80° C. F5 (width direction) (MPa) | 102 | 89 | 91 | 91 | 100 | 93 | 97 |
| | 80° C. F5 (longitudinal direction) (MPa) | 21 | 21 | 21 | 20 | 21 | 22 | 21 |
| | 23° C. Young's modulus (width direction) (GPa) | 7.4 | 7.1 | 6.7 | 6.7 | 6.9 | 6.9 | 7.1 |
| | 23° C. Young's modolus (longitudinal direction) (GPa) | 2.7 | 2.5 | 2.5 | 2.6 | 2.5 | 2.6 | 2.5 |
| | 80° C. Young's modulus (width direction) (GPa) | 3.3 | 3.0 | 3.0 | 3.0 | 3.2 | 3.0 | 3.2 |
| | 80° C. Young's modulus (longitudinal direction) (GPa) | 0.8 | 1.0 | 1.0 | 0.9 | 1.0 | 1.0 | 0.9 |
| | Tensile breaking strength (width direction) (MPa) | 450 | 397 | 366 | 396 | 435 | 373 | 379 |
| | Tensile breaking strength (longitudinal direction) (MPa) | 134 | 106 | 105 | 111 | 114 | 106 | 117 |
| | Tensile elongation at break (width direction) (%) | 27 | 26 | 22 | 32 | 29 | 24 | 21 |
| | Tensile elongation at break (longitudinal direction) (%) | 178 | 176 | 172 | 179 | 199 | 182 | 173 |
| | TMA (width direction) (μm) | 25 | 13 | 18 | 11 | 11 | 34 | 21 |
| | TMA (longitudinal direction) (μm) | 1386 | 1551 | 1189 | 1335 | 1487 | 1724 | 1304 |
| | 120° C. heat shrinkage rate (width direction) (%) | 4.0 | 3.0 | 2.2 | 3.0 | 3.0 | 3.3 | 3.0 |
| | 120° C. heat shrinkage rate (longitudinal direction) (%) | 1.0 | 1.0 | 1.0 | 0.8 | 1.0 | 1.0 | 1.0 |
| | 150° C. heat shrinkage rate (width direction) (%) | 27.3 | 22.0 | 18.2 | 17.8 | 24.7 | 18.3 | 17.7 |
| | 150° C. heat shrinkage rate (longitudinal direction) (%) | 7.0 | 5.0 | 4.2 | 5.2 | 5.3 | 5.8 | 3.5 |
| | Refractive index Ny in width direction | 1.5245 | 1.5254 | 1.5258 | 1.5250 | 1.5261 | 1.5260 | 1.5249 |

TABLE 3-continued

|  |  |  |  |  |  |  |  |
|---|---|---|---|---|---|---|---|
| Refractive index Nx in longitudinal direction | 1.5020 | 1.5028 | 1.5034 | 1.5030 | 1.5020 | 1.5031 | 1.5031 |
| Refractive index Nz in thickness direction | 1.4985 | 1.5001 | 1.5001 | 1.5000 | 1.4997 | 1.5007 | 1.4998 |
| ΔNy | 0.0243 | 0.0240 | 0.0240 | 0.0235 | 0.0253 | 0.0241 | 0.0234 |
| Plane orientation coefficient ΔP | 0.0148 | 0.0140 | 0.0145 | 0.0140 | 0.0144 | 0.0139 | 0.0142 |
| X-ray half width (°) | 20.6 | 22.2 | 23.0 | 23.8 | 20.2 | 23.6 | 23.6 |
| Degree of X-ray orientation | 0.89 | 0.88 | 0.87 | 0.87 | 0.89 | 0.87 | 0.87 |
| Bending resistance (width direction) (mN cm) | 0.60 | 0.68 | 0.71 | 0.70 | 0.56 | 0.67 | 0.60 |
| Bending resistance (longitudinal direction) (mN cm) | 0.34 | 0.37 | 0.39 | 0.39 | 0.30 | 0.35 | 0.33 |
| Loop stiffness gradient a (width direction) | 0.00114 | 0.00120 | 0.00117 | 0.00113 | 0.00120 | 0.00117 | 0.00110 |
| Loop stiffness gradient a (longitudinal direction) | 0.00038 | 0.00048 | 0.00049 | 0.00046 | 0.00044 | 0.00045 | 0.00046 |

|  |  | Example 8 | Comparative Example 1 | Comparative Example 2 | Comparative Example 3 | Comparative Example 4 | Comparative Example 5 |
|---|---|---|---|---|---|---|---|
| Film characteristics | Thickness (μm) | 20.1 | 18.6 | 20.0 | 19.2 | 21.2 | 13.4 |
|  | Haze (%) | 2.0 | 1.0 | 1.1 | 0.4 | 0.4 | 0.6 |
|  | 23° C. F5 (width direction) (MPa) | 188 | 133 | 131 | 158 | 183 | 210 |
|  | 23° C. F5 (longitudinal direction) (MPa) | 46 | 44 | 44 | 39 | 46 | 55 |
|  | 80° C. F5 (width direction) (MPa) | 100 | 72 | 68 | 65 | 84 | 98 |
|  | 80° C. F5 (longitudinal direction) (MPa) | 21 | 20 | 20 | 13 | 18 | 23 |
|  | 23° C. Young's modulus (width direction) (GPa) | 7.3 | 5.5 | 5.7 | 6.1 | 7.1 | 7.7 |
|  | 23° C. Young's modolus (longitudinal direction) (GPa) | 2.6 | 2.7 | 2.6 | 2.4 | 2.6 | 2.9 |
|  | 80° C. Young's modulus (width direction) (GPa) | 3.2 | 2.2 | 2.0 | 2.1 | 2.9 | 3.4 |
|  | 80° C. Young's modulus (longitudinal direction) (GPa) | 1.0 | 0.9 | 0.9 | 0.6 | 0.6 | 0.9 |
|  | Tensile breaking strength (width direction) (MPa) | 391 | 336 | 344 | 414 | 430 | 476 |
|  | Tensile breaking strength (longitudinal direction) (MPa) | 113 | 118 | 124 | 163 | 160 | 182 |
|  | Tensile elongation at break (width direction) (%) | 22 | 37 | 44 | 29 | 27 | 33 |
|  | Tensile elongation at break (longitudinal direction) (%) | 190 | 188 | 219 | 201 | 192 | 160 |
|  | TMA (width direction) (μm) | 23 | 222 | 198 | 13 | 6 | 18 |
|  | TMA (longitudinal direction) (μm) | 1361 | 1574 | 1487 | 2422 | 1629 | 2411 |
|  | 120° C. heat shrinkage rate (width direction) (%) | 2.7 | 0.7 | 1.0 | 9.8 | 6.5 | 2.7 |
|  | 120° C. heat shrinkage rate (longitudinal direction) (%) | 0.8 | 1.3 | 1.3 | 4.0 | 1.7 | 1.5 |
|  | 150° C. heat shrinkage rate (width direction) (%) | 17.3 | 11.7 | 13.2 | 57.0 | 43.0 | 37.8 |
|  | 150° C. heat shrinkage rate (longitudinal direction) (%) | 4.3 | 4.7 | 4.3 | 34.0 | 17.0 | 13.7 |
|  | Refractive index Ny in width direction | 1.5259 | 1.5252 | 1.5245 | 1.5187 | 1.5215 | 1.5251 |
|  | Refractive index Nx in longitudinal direction | 1.5020 | 1.5050 | 1.5058 | 1.4991 | 1.5010 | 1.4997 |
|  | Refractive index Nz in thickness direction | 1.4999 | 1.5012 | 1.5010 | 1.4952 | 1.4973 | 1.4980 |
|  | ΔNy | 0.0250 | 0.0221 | 0.0212 | 0.0216 | 0.0224 | 0.0262 |
|  | Plane orientation coefficient ΔP | 0.0141 | 0.0139 | 0.0141 | 0.0137 | 0.0140 | 0.0144 |
|  | X-ray half width (°) | 21.8 | 28.6 | 28.9 | 23.9 | 24.4 | 21.2 |
|  | Degree of X-ray orientation | 0.88 | 0.84 | 0.84 | 0.87 | 0.86 | 0.88 |
|  | Bending resistance (width direction) (mN cm) | 0.61 | 0.42 | 0.50 | 0.82 | 0.72 | 0.36 |
|  | Bending resistance (longitudinal direction) (mN cm) | 0.36 | 0.31 | 0.34 | 0.43 | 0.35 | 0.24 |
|  | Loop stiffness gradient a (width direction) | 0.00127 | 0.00112 | 0.00109 | 0.00087 | 0.00087 | 0.00138 |
|  | Loop stiffness gradient a (longitudinal direction) | 0.00046 | 0.00052 | 0.00050 | 0.00035 | 0.00035 | 0.00059 |

The invention claimed is:

1. A biaxially oriented polypropylene film, wherein a maximum elongation of the biaxially oriented polypropylene film at 150° C. or lower, as measured by raising the temperature from 30° ° C. to 180° ° C. at 20° C./min with a measurement load of 40 g using a thermomechanical analyzer (TMA), is not larger than 1.5 mm in a longitudinal direction and not larger than 0.1 mm in a width direction for a sample having a width of 4 mm with a chuck spacing of 10 mm, and a heat shrinkage rate of the biaxially oriented polypropylene film at 150° C. is not higher than 10% in the longitudinal direction and not higher than 30% in the width direction.

2. The biaxially oriented polypropylene film according to claim 1, wherein a heat shrinkage rate of the biaxially oriented polypropylene film at 120° C. is not higher than 2.0% in the longitudinal direction and not higher than 5.0% in the width direction, and the heat shrinkage rate at 120° C. in the longitudinal direction is lower than the heat shrinkage rate at 120° C. in the width direction.

3. The biaxially oriented polypropylene film according to claim 1, wherein a refractive index Ny in the width direction of the biaxially oriented polypropylene film is not lower than 1.5230, and ΔNy of the biaxially oriented polypropylene film is not lower than 0.0220.

4. The biaxially oriented polypropylene film according to claim 1, wherein the biaxially oriented polypropylene film has a haze of 5.0% or lower.

5. The biaxially oriented polypropylene film according to claim 1, wherein a polypropylene resin forming the biaxially oriented polypropylene film has a mesopentad fraction of 97.0% or higher.

6. The biaxially oriented polypropylene film according to claim 1, wherein the polypropylene resin forming the biaxially oriented polypropylene film has a crystallization temperature of 105° C. or higher and a melting point of 160° C. or higher.

7. The biaxially oriented polypropylene film according to claim 1, wherein the polypropylene resin forming the biaxially oriented polypropylene film has a melt flow rate of 4.0 g/10 minutes or higher.

8. The biaxially oriented polypropylene film according to claim 1, wherein an amount of a component having a molecular weight of 100,000 or lower in the polypropylene resin forming the biaxially oriented polypropylene film is not smaller than 35% by mass.

9. The biaxially oriented polypropylene film according to claim 1, wherein the biaxially oriented polypropylene film has an orientation degree of 0.85 or higher.

10. The biaxially oriented polypropylene film according to claim 2, wherein a refractive index Ny in the width direction of the biaxially oriented polypropylene film is not lower than 1.5230, and ΔNy of the biaxially oriented polypropylene film is not lower than 0.0220.

11. The biaxially oriented polypropylene film according to claim 10, wherein the biaxially oriented polypropylene film has a haze of 5.0% or lower.

12. The biaxially oriented polypropylene film according to claim 11, wherein a polypropylene resin forming the biaxially oriented polypropylene film has a mesopentad fraction of 97.0% or higher.

13. The biaxially oriented polypropylene film according to claim 12, wherein the polypropylene resin forming the biaxially oriented polypropylene film has a crystallization temperature of 105° C. or higher and a melting point of 160° C. or higher.

14. The biaxially oriented polypropylene film according to claim 13, wherein the polypropylene resin forming the biaxially oriented polypropylene film has a melt flow rate of 4.0 g/10 minutes or higher.

15. The biaxially oriented polypropylene film according to claim 14, wherein an amount of a component having a molecular weight of 100,000 or lower in the polypropylene resin forming the biaxially oriented polypropylene film is not smaller than 35% by mass.

16. The biaxially oriented polypropylene film according to claim 15, wherein the biaxially oriented polypropylene film has an orientation degree of 0.85 or higher.

* * * * *